US010918091B2

(12) United States Patent
Sieck (10) Patent No.: US 10,918,091 B2
(45) Date of Patent: Feb. 16, 2021

(54) LONG RANGE LOW POWER LIVESTOCK MONITORING

(71) Applicant: Brent Allen Sieck, Martell, NE (US)

(72) Inventor: Brent Allen Sieck, Martell, NE (US)

(73) Assignee: SIECK RANCH, INC., Martell, NE (US)

( * ) Notice: Subject to any disclaimer, the term of this patent is extended or adjusted under 35 U.S.C. 154(b) by 0 days.

(21) Appl. No.: 16/673,056

(22) Filed: Nov. 4, 2019

(65) Prior Publication Data

US 2020/0146263 A1 May 14, 2020

Related U.S. Application Data

(60) Provisional application No. 62/757,976, filed on Nov. 9, 2018.

(51) Int. Cl.
*G08B 1/08* (2006.01)
*A01K 29/00* (2006.01)
*A01K 11/00* (2006.01)
*G08C 17/02* (2006.01)

(52) U.S. Cl.
CPC .......... *A01K 29/005* (2013.01); *A01K 11/004* (2013.01); *A01K 11/006* (2013.01); *G08C 17/02* (2013.01)

(58) Field of Classification Search
CPC .............................. A01K 29/005; G08C 17/02
USPC ..... 340/539.11, 539.13, 573.1, 573.4, 10.41; 119/174, 850, 854, 856
See application file for complete search history.

(56) References Cited

U.S. PATENT DOCUMENTS

| | | | |
|---|---|---|---|
| 4,635,587 A * | 1/1987 | Leonardo | A61D 17/002 340/573.3 |
| 5,542,431 A | 8/1996 | Starzl et al. | |
| 6,236,318 B1 * | 5/2001 | Yang | A61D 17/002 119/174 |
| 7,083,575 B1 | 8/2006 | Claycomb et al. | |
| 9,119,379 B1 | 9/2015 | Yancey et al. | |
| 10,080,348 B2 * | 9/2018 | Sharpe | A01K 29/005 |
| 10,420,634 B2 * | 9/2019 | Folkers | A61D 17/002 |
| 2008/0110406 A1 * | 5/2008 | Anderson | A01K 11/00 119/174 |

* cited by examiner

*Primary Examiner* — Tai T Nguyen
(74) *Attorney, Agent, or Firm* — Barnes & Thornburg LLP (57) ABSTRACT

Systems for long range low power cattle monitoring include a tail patch for sensing mounting activity and communicating the sensed activity via low power communications techniques. Low power, LoRaWAN, communications with long range capabilities can provide extended range for monitoring breeding activity while conserving energy use.

21 Claims, 8 Drawing Sheets

LONG RANGE LOW POWER LIVESTOCK MONITORING

CROSS-REFERENCE TO RELATED APPLICATIONS

This U.S. Non-Provisional Patent Application claims the benefit of priority of U.S. Provisional Application No. 62/757,976, filed on Nov. 9, 2018, the disclosure of which is incorporated by reference in its entirety, including but without limitation, those portions related to livestock monitoring.

FIELD

The present disclosure relates generally to devices, systems, and methods related to livestock, and more specifically to devices, systems, and methods for livestock monitoring.

BACKGROUND

Monitoring livestock can provide valuable information regarding various livestock assets. Livestock information can be applied to benefit the health and well-being of the assets, and/or improve efficiency of livestock activities.

For example, monitoring livestock for breeding-related information can provide improved likelihood of healthy breeding. However, accurately monitoring livestock assets can present challenges in obtaining cost-effective, accurate information.

SUMMARY

The present disclosure may comprise one or more of the following features and combinations thereof.

According to one aspect of the present disclosure, a long range livestock monitor for communicating breeding periods of an animal asset may include a flexible tail mount housing for securing about the animal asset's tail head near the asset's hindquarters, a mount detector arranged within the tail mount housing, the mount detector configured to sense physical effect of asset mounting and to responsively generate a mount indicator signal, and a communications control system in communication with the mount detector. The communications control system may include a processor for receiving the mount indicator signal from the mount detector and determining mounting activity based on the mount indicator signal, and a transmitter for communicating a mounting signal indicating mounting responsive to determination of mounting activity.

In some embodiments, the tail mounting housing may be coupled to the asset by conforming engagement with a tail head of the asset. In some embodiments, the monitoring system may further comprise a flexible control board within the flexible tail mount housing. The flexible control board may extend, or be configured to extend, across a tail head of the asset with conforming curvature.

In some embodiments, the mount detector may be coupled with the flexible control board. The mount detector may be formed at least partly integral with the flexible control board. In some embodiments, the transmitter may be coupled with the flexible control board.

In some embodiments, the processor may be coupled with the flexible control board. In some embodiments, at least one the transmitter and the processor is arranged on one lateral side of the tail head of the asset. In some embodiments, each of transmitter and the processor is arranged on one lateral side of the tail head of the asset.

In some embodiments, the mount detector may be arranged on top of the tail head of the asset. In some embodiments, the monitoring system may comprise a flexible control board having thickness less than 0.02 inches. The tail mount housing may define a maximum thickness of less than 0.25 inches. In some embodiments, the transmitter may include a LoRa transmitter.

According to another aspect of the present disclosure, a long range livestock monitoring system for communicating breeding periods of an animal asset may include a flexible tail mount housing for securing to the animal asset's tail head near the asset's hindquarters, a mount detector coupled with the tail mount housing, the mount detector configured to sense physical effect of asset mounting and to responsively generate a mount indicator signal, and a communications control system in communication with the mount detector. The communications control system may include a processor for receiving the mount indicator signal from the mount detector and determining mounting activity based on the mount indicator signal, and a transmitter for communicating a mounting signal indicating mounting responsive to determination of mounting activity.

In some embodiments, the monitoring system may further comprise a LoRa gateway configured to receive the breeding signal from the communications control system. The LoRa gateway may be arranged more than 1 mile from the asset having no intermediary communication device between the flexible tail mount housing and the LoRa gateway. The LoRa gateway may be configured to communicate an indication of the mounting signal with a remote server responsive to receiving the mounting signal.

In some embodiments, the transmitter may be a LoRa transmitter configured to communicate the mounting signal with a frequency within the range of 902.3 to 914.9 MHz. The tail mount housing may be mounted to the asset by conforming engagement with the tail head of the asset.

According to another aspect of the present disclosure, a long range livestock monitoring system for monitoring breeding periods of an animal asset may include a tail patch for securing to the animal asset near the asset's hindquarters, the tail patch including a breeding detector for sensing asset mounting, a processor for communicating a mount indication signal responsive to sensing of asset mounting by the breeding detector, and communication circuitry for sending the mount indication signal according to the processor, and an ear tag for securing to the animal asset near the asset's head. The ear tag may include communication circuitry for receiving the mount indication signal from the tail patch and a transmitter for communicating a mounting signal indicating mounting activity.

According to another aspect of the present disclosure, a livestock monitoring system for monitoring preferred breeding periods of an animal asset may include a tail patch for securing to the animal asset near the asset's hindquarters. The tail patch may include a breeding detector for sensing asset mounting. The tail patch may include a processor for communicating a mount signal responsive to sensing of asset mounting by the breeding detector and communication circuitry for sending the mount signal according to the processor. The system may include an ear tag for securing to the animal asset near the asset's head. The ear tag may include communication circuitry for receiving the mount signal from the tail patch and for communicating a breeding signal indicating breeding activity.

In some embodiments, the system may include at least one near field gateway for receiving the breeding signal from the ear tag. The at least one near field gateway may be arranged within 10 miles of the asset. The at least one near field gateway may be arranged more than 1 mile from the asset. Responsive to reception of the breeding signal the at least one near field gateway may communicate an indication of breeding to a network server.

In some embodiments, responsive to reception of the breeding signal the at least one near field gateway may communicate an indication of breeding to a backhaul server for communication of an indication of breeding to the network server. Communication between the backhaul server and the network server may include at least one of Ethernet, 3G, 4G, and Wifi communication.

In some embodiments, the ear tag may include a power storage device. The ear tag may include a processor for executing instructions to govern reception of the mount signal and communication of the breeding signal. The breeding detector may include a piezoelectric device for generating an electrical signal responsive to force of asset mounting. The force may be pressure and/or impact vibration.

In some embodiments, the tail patch may not include a power storage device. The ear tag may be configured to communicate the breeding signal using Low Power Wide Area Network communication. The Low Power Wide Area Network communication may include LoRaWAN communication protocols.

According to another aspect of the present disclosure, a method of livestock monitoring for monitoring preferred breeding periods of an animal asset may include sensing asset mounting, responsive to the sensing of assert mounting, communicating from a tail patch a mounting signal, and responsive to the mounting signal, communicating from an ear tag a breeding signal. In some embodiments, sensing asset mounting may include generating an electrical signal from a piezoelectric device of the tail patch, responsive to force of asset mounting. The force may include pressure and/or impact vibration of mounting.

According to another aspect of the present disclosure, a tail patch for securing near an animal asset's hindquarter for monitoring preferred breeding periods may include a breeding detector for sensing asset mounting. The tail patch may include a processor for communicating a mount signal responsive to sensing of asset mounting by the breeding detector, and communication circuitry for sending the mount signal according to the processor. In some embodiments, the communication circuitry may be configured to communicate the mount signal to an ear tag secured with the asset. In some embodiments, the tail patch may include no power storage device.

According to another aspect of the present disclosure, an ear tag for securing near an animal asset's head for monitoring preferred breeding periods may include communication circuitry for communicating a breeding signal indicating breeding activity, responsive to receiving a mount signal from a tail patch. In some embodiments, the communication circuitry may be configured to communicate the breeding signal using Low Power Wide Area Network communication.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Monitoring livestock, such as cattle, can be challenging. The number of livestock of typical commercial livestock operations, together with the amount of land area that livestock require can present challenges in communication of monitoring information.

Among other parameters of interest for monitoring in livestock, monitoring livestock for preferred breeding periods can assist in selective opportune breeding conditions. For example, monitoring estrus cycles for cows/heifers (cattle) can indicate a desirable time period for insemination, increasing the likelihood of healthy breeding. Systems, devices, and methods for overcoming the challenges of livestock monitoring are discussed herein.

Figure 1:
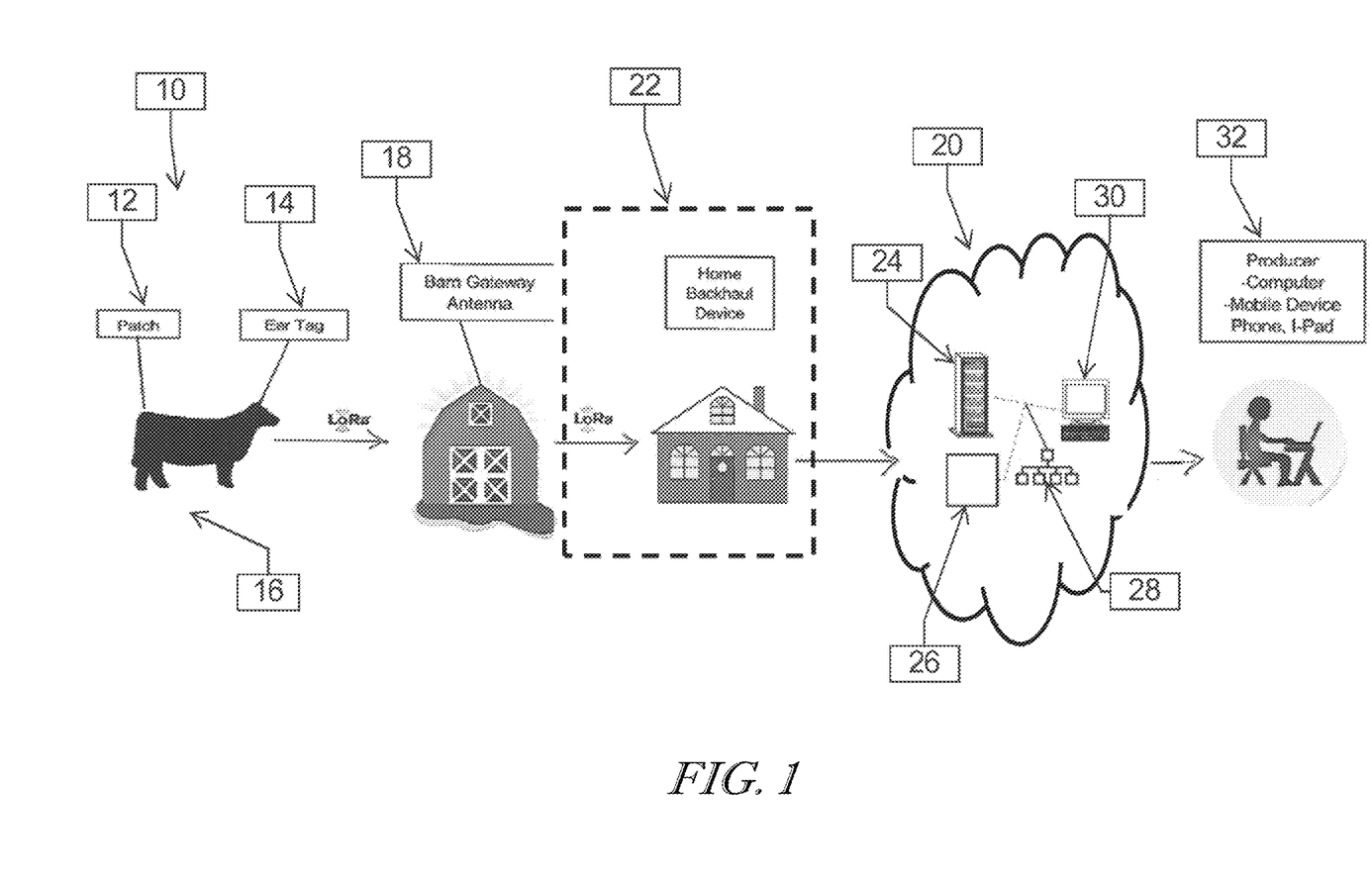
FIG. 1 is diagrammatic view of a monitoring system for livestock showing that the system includes a tail patch for sensing mounting activity and communicating an indication of the mounting activity to an ear patch, and showing that the ear tag can communicate an indication of breeding activity to a local gateway using Low Power Wide Area Network communication, and showing that an indication of breeding activity can be communicated from the gateway to a server (optionally via a backhaul server)

Referring to FIG. 1, a livestock monitoring system 10 includes a tail patch 12 and an ear tag 14, each secured with an animal asset 16. The tail patch 12 is adapted to sense mounting of the assets, by other livestock, for example, mounting of a heifer or cow asset 16 (to which the tail patch is secured) by a bull or another cow. Upon sensing of mounting, the tail patch 12 communicates an indication of mounting to the ear tag 14.

The ear tag 14 receives the indication of mounting from the tail patch 12. The indication is illustratively embodied as a wireless communication signal. Responsive to receiving the indication of mounting, the ear tag 14 generates a breeding signal. The ear tag 14 sends the breeding signal for remote communication.

The breeding signal is illustratively embodied as an indication of breeding activity provided by Low-Power Wide-Area Network (LPWAN) communications. For example, the LPWAN may include Long Range Wide Area Network (LoRaWAN™) protocols. The ear tag 14 can communicate the breeding signal over distances up to 10 miles away using LPWAN communications providing reliable monitoring over large areas suitable for livestock.

In the illustrative embodiments, LoRaWAN™ may define 64, 125 kHz uplink channels from 902.3 to 914.9 MHz, in 200 kHz increments. There may be an additional eight 500 KHz uplink channels in 1.6 MHz increments, from 903 MHz to 914.9 MHz. Eight downlink channels may be 500 kHz wide, starting from 923.3 MHz to 927.5 MHz. The maximum output power in North America 902-928 MHz band may be +30 dBm although for most applications +20 dBm may be sufficient. In the illustrative embodiments, LPWAN communications may include frequency hopping and/or digital modulation.

In the illustrative embodiment, the breeding signal is received by a local gateway, namely, near field gateway 18. The near field gateway 18 is illustratively embodied as a relatively local gateway adapted to receive the breeding signal for further communication. The near field gateway 18 illustratively include communications circuitry including an antenna supported by a barn, and can include processors and memory devices as required, but in some embodiments may be arranged in any suitable manner to receive the breeding signal from the ear tag 14 for further communication. The near field gateway 18 communicates an indication of the breeding signal to a remote server.

As shown in FIG. 1, the near field gateway 18 communicates an indication of the breeding signal to a remote server 20, embodied as a cloud server, for example via cellular communication. Optionally, the near field gateway 18 can communicate with the remote server 20 via an intermediary backhaul server 22 via LPWAN, local to the near field gateway 18, for further communication to the remote server 20 via Local Area Network (LAN) (e.g., Ethernet, Wifi) or cellular. In some embodiments, the backhaul server 22 may be formed as part of the near field gateway 18 and/or remote server 20.

The remote server 20 illustratively includes process servers 24, memory devices 26, network communications circuitry 28, and/or terminals 30 as required to manage the LPWAN network. The remote server 20 may filter redundant packets, perform security checks, schedule communications, perform adaptive data rate handling, and/or otherwise optimize the LPWAN communications.

The remote server 20 is configured to communicate with end user devices 32. Such devices 32 may include, for example, personal mobile electronic devices such as mobile phones, tablets, wearable electronics, etc. The user can access information about the monitored asset via the device 32. For example, the breeding signals received by the remote server 20 may indicate a high likelihood of estrus cycle of the asset 16. From an indication of high likelihood of estrus cycle, a preferred breeding period can be determined for healthy offspring.

Figure 2:
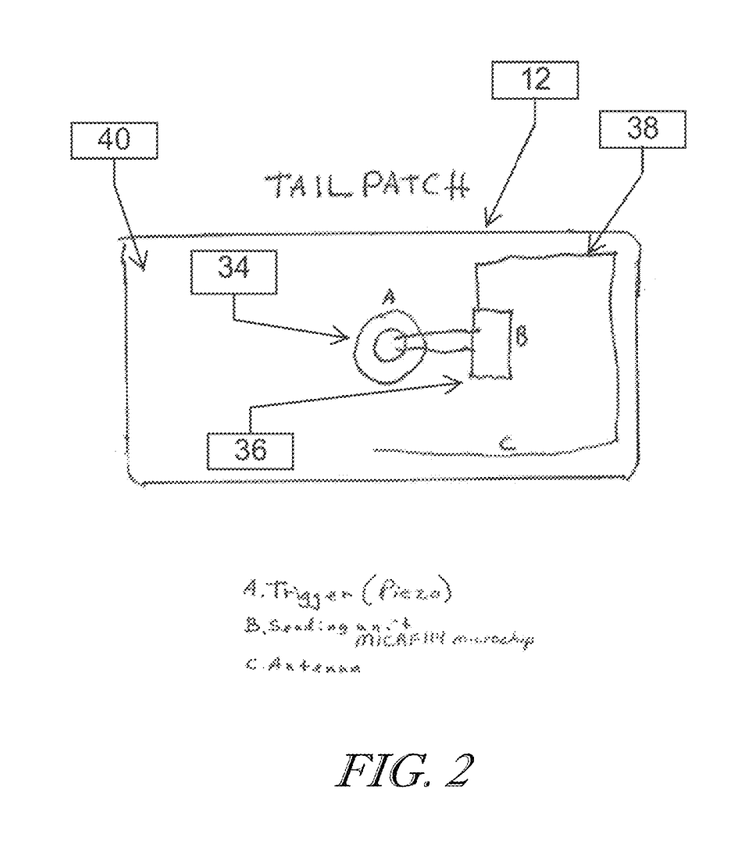
FIG. 2 a diagrammatic view of the tail patch of FIG. 1 showing that the tail patch includes a breeding detector for sensing mounting activity and circuitry for communication of mounting activity to the ear tag.

Referring now to the illustrative embodiment of FIG. 2, the tail patch 12 for securing to the asset 16. As previously mentioned, the tail patch 12 is illustratively secured near the asset's hindquarters, e.g., at the base of the asset's tail, includes a detector 34 for activation to indicate mounting. The detector 34 is illustratively embodied as a piezoelectric sensor adapted to generate electrical signals responsive to mechanical force.

The detector 34 is illustratively arranged to experience mechanical force from asset mounting. The detector 34 generates electrical signals responsive to the mounting force. In the illustrative embodiment, the piezoelectric sensor generates electrical signals for communication to the ear tag 14, without additional power storage device. The pressure from mounting activity generates the electrical signals for communication as mounting signals to the ear tag 14. In some embodiments, mounting signals may be generated from any suitable mechanical stress indicating mounting activity, for example, but without limitation, vibration.

The tail patch 12 illustratively includes a receiving unit 36 and communication circuitry 38 for sending communication signals to the ear tag 14. The receiving unit 36 is illustratively embodied as a processor executing embedded instructions to communicate mounting signals to the ear tag 14 as wireless signals, responsive to the electrical signals from the detector 34, although in some embodiments, the tail patch 12 may include a memory device having programmable instructions for wireless signal communications. The communication circuitry 38 illustratively includes broadcast antenna and other components and arrangements as needed to generate wireless signals according to direction by the processor 36 to communicate mounting signals to the ear tag 14. The tail patch 12 includes a patch card 40 forming a housing base on which the detector 34, processor 36, and communication circuitry 38 are mounted.

Figure 3:
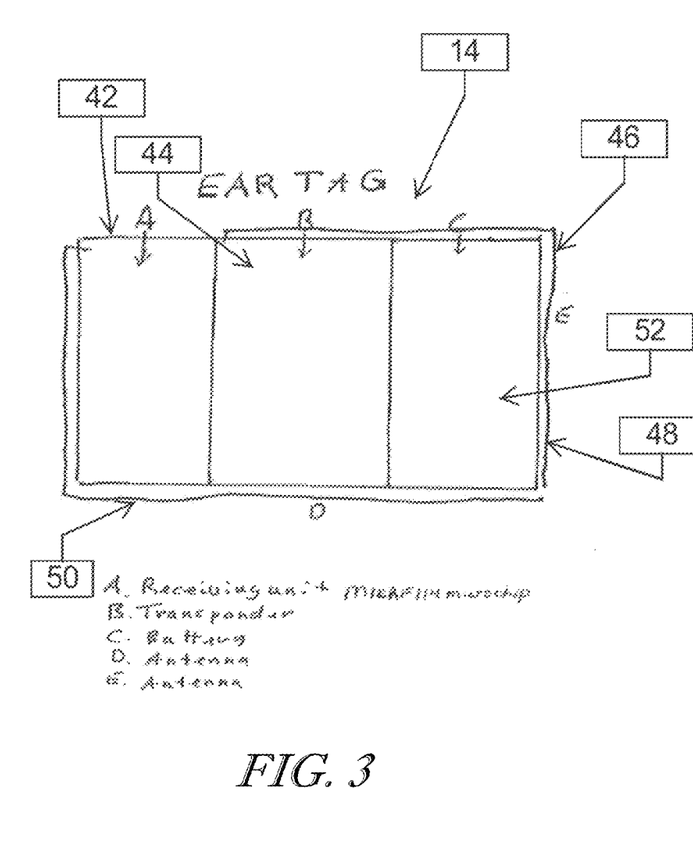
FIG. 3 is a diagrammatic view of the ear tag of FIG. 1 showing that the ear tag includes circuitry for communicating the indication of breeding activity via Low Power Wide Area Network communication.
Figure 4:
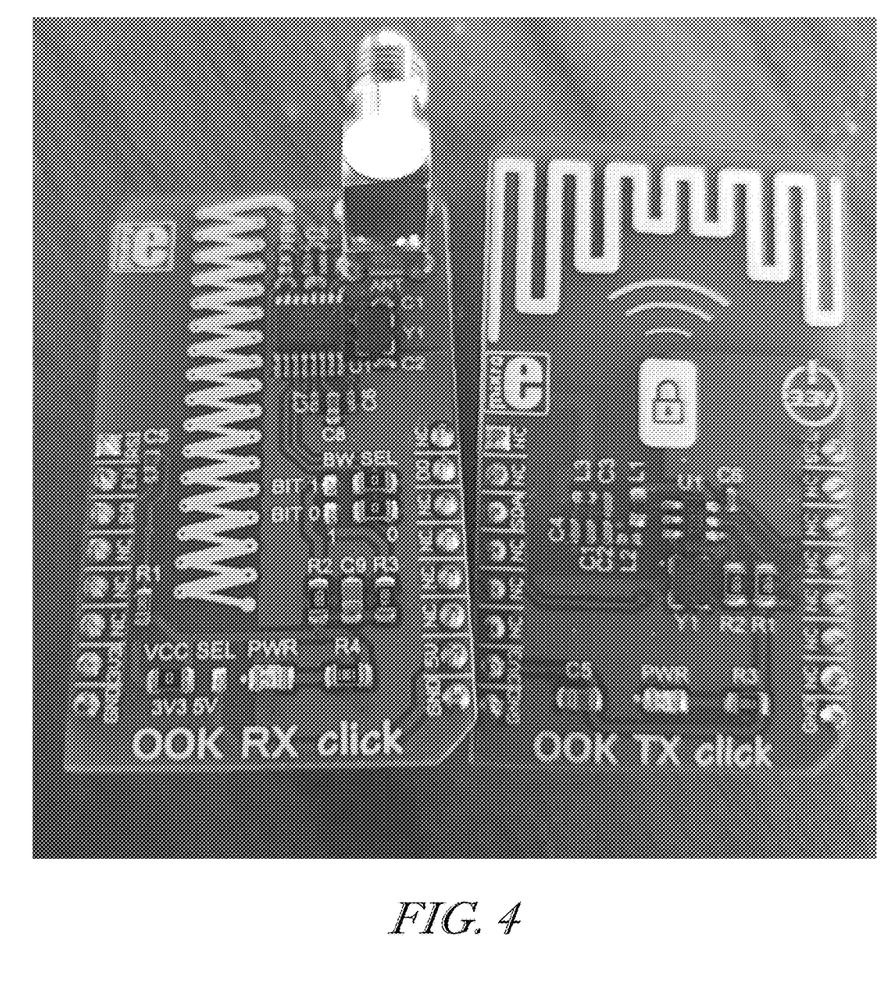
FIG. 4 is a photograph of portions of an exemplary ear tag including circuitry for receiving signals from the tail patch and for sending signals using Low Power Wide Area Network communication.

Referring now to the illustrative embodiment of FIG. 3, the ear tag 14 includes a receiving unit 42 embodied as a processor having programmable memory, transponder 44, and communication circuitry 46 for receiving communication signals from the tail patch 12 and for communicating breeding signals to the gateway 18. The communication circuitry 46 illustratively includes receiving 48 and broadcast 50 antenna and related components and arrangements to achieve their associated functions, but in some embodiments, may include shared hardware. The ear tag 14 may include a power storage device 52 for providing power to communicate the breeding signals to the gateway 18. Responsive to receiving the mounting signals from the tail patch 12, the ear tag 14 generates at least one breeding signal as LPWAN communications for communication to the gateway 18 indicating occurrence of breeding activity.

The mounting signals are illustratively embodied as semi-active RFID communications powered by the piezoelectric device (detector 34), but in some embodiments, may include partially or fully passive RFID communication receiving activation energy from the power storage device 52 of the ear tag 14. The present disclosure includes devices, systems, and methods for monitoring preferred breeding periods by LPWAN communications activated by local communications, such as RFID communications. The arrangements of the present disclosure can enable low power consumption and/or low cost monitoring over relatively long-range areas.

Devices, systems, and methods within the present disclosure may include a "Perfect Timing" or "HeatSiecker" Heat Detection System for cattle breeding. A heat patch and ear tag system detects cow estrus. Data on individual cattle can be relayed via Gateway Antenna to a producer's computer or mobile device. Insemination can then be prioritized based on the real time data to determine the "perfect" or preferred window for breeding, allowing the producer to optimize, for example, maximize, their fertility rates.

Patch—A tail patch may sense the pressure from the mounting of another cow, then sends that signal to the ear tag. Ear Tag—An RFID tag may send information gathered from the patch to a barn antenna via a LPWAN network, such as a LoRa network which may have a 3 year battery life. Barn Gateway Antenna—This antenna may receive data from the cow from distances of 3-10 miles and send this information to a backhaul device. Home Backhaul Device—A small unit that may receive LPWAN (LoRa) information from the Gateway and send it out through Wi-Fi (or other suitable communications) to Small Data Tech (SOT), the service provider. SOT—After data is received from cow, SOT may send it to the producer. Producer—Producer may have the option to view herd information on mounting activity through a computer via a website or mobile device via an app. Information provided may be individual cow ID and time/date of each mount activity. A breeding window of 12-18 hours may be computed from the 3rd active mount and may be displayed by sending to personal electronic device.

Use of the LoRaWAN Network can allow the cattle to be up to 3-10 miles, including 5-7 miles from Barn Gateway Antenna. The Gateway to Home Backhaul device may have similar range from the cattle to Gateway. Remote monitoring of cattle can allow efficiency of the decision maker's time and proximity to cattle. LoRaWAN is a Low Power Wide Area Network (LPWAN) specification intended for wireless battery-operated devices in a regional, national or global network. Devices may transmit a signal to the nearest gateway. The service provider may incorporate multi-hop technology through a series of concentrators. Data may transfer through a fiber-optic hub to the network server. Data may then be delivered to the end-user's application.

Figure 5:
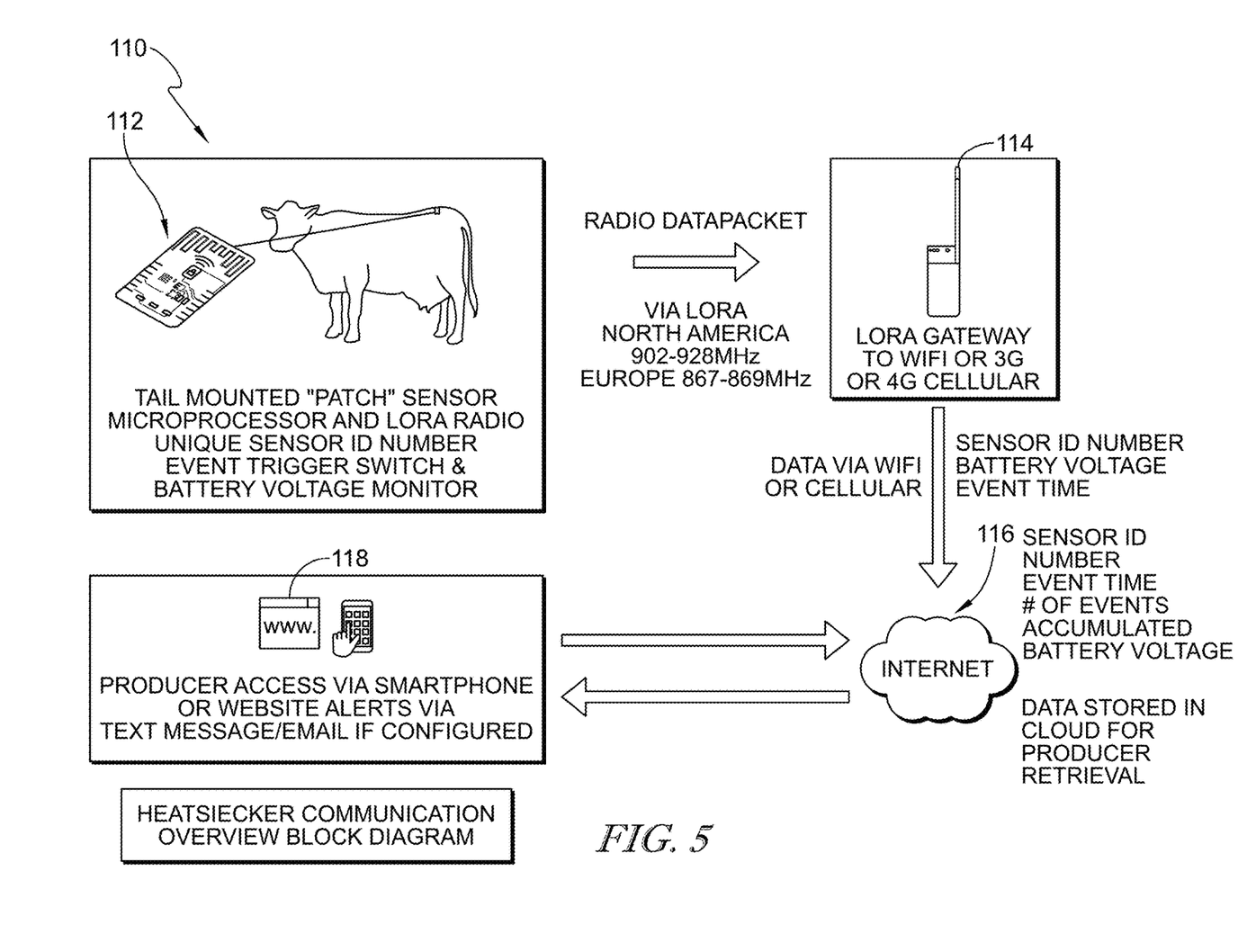
FIG. 5 is a diagrammatic view of another embodiment of a monitoring system including a tail patch for securing to an animal asset.

Referring now to FIG. 5, another embodiment of a livestock monitoring system 110 comprises a tail patch 112 configured for securing to the animal asset near the asset's hindquarters. As discussed in additional detail herein, the system 110 is similar to the system 10, except the tail patch 112 additionally incorporates features of the ear tag 14 integrally within a signal unit for securing to near the asset's hindquarters. The disclosure regarding the system 10, applies equally to the system 110, except in instances of conflict with the specific disclosure of tail patch 112.

The tail patch 112 is configured to sense mounting of the animal asset and in response to sensing of mounting, to generate a mounting signal. The tail patch 112 communicates the mounting signal with a gateway 114. The tail patch 112 illustratively communicates the mounting signal with the gateway 114 as a LPWAN signal embodied as LoRa signal, using LoRaWAN communication protocols, although in some embodiments, any suitable long range, low power communications may be applied. Using LoRa communications can provide enhanced range of communications for cattle which may be far from a gateway 114, for example, from about 1 to about 10 miles, from a gateway 114, while conserving power consumption via discrete and limited information transfer.

Responsive to the mounting signal, the gateway 114 communicates an indication of mounting signal with a remote server 116, illustratively embodied as an internet cloud server. The gateway 114 illustratively communicates with the remote server 116 via WiFi, although in some embodiments, may communicate with the remote server 116 via cellular, such as 3G, 4G, and/or 5G.

The remote server 116 communicates mounting information with a user device 118. The user can access mounting information from the remote server 116 via a website or installed application. In the illustrative embodiment, the mounting signal and indication thereof includes a unique sensor identification (ID) of the tail patch 112, and may include other information such as an accumulated number of mount sensations within a period of time, and/or battery levels of the tail patch 112, although in some embodiments, merely sensor identification or tail patch anonymous mounting indication may be provided. The user can illustratively access the sensor ID and/or other information as mounting information. Accordingly, the user can access the mounting information to determine whether preferred breeding conditions are indicated.

The availability of such mounting information on a user's personal mobile device is particularly advantageous in livestock monitoring, which can require vast areas for animal assets to exist. For example, in the instance of cattle, the cattle may be located miles away from occupied structures at any given moment and monitoring mounting activity can be particularly challenging. Moreover, managing large areas for livestock can require the user to generally travel large distances in managing various operations, e.g., feed, breeding, treatment, and/or other operations, and remote access to mounting information can be important to timely decision making regarding breeding activities.

Figure 6:
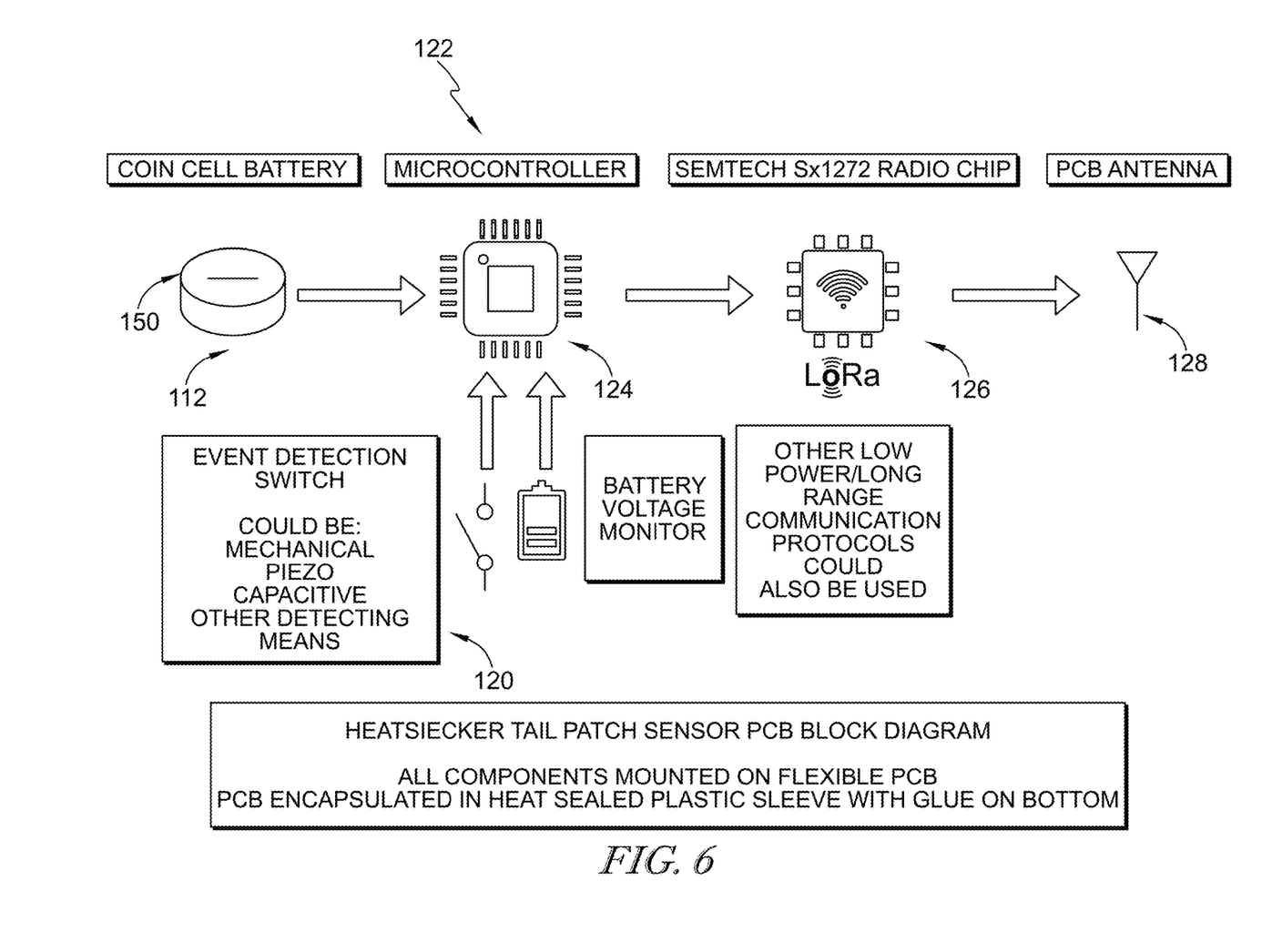
FIG. 6 is a diagrammatic view of certain aspects of the tail patch of FIG. 5.

Referring now to FIG. 6, a diagrammatic view of components of the tail patch 112 is shown. The tail patch 112 illustratively includes a mount detector 120 for sensing when the asset is mounted, and a communications system 122 for communicating asset mounting. The communications system 122 illustratively includes a processor 124 for receiving indication from the mount detector 120 that mounting occurs and responsively communicating mount indicator signal, and a transmitter 126 for receiving the mount indicator signal from the processor 124 and communicating the mounting signal.

In the illustrative embodiment, the communications system 122 includes an antenna 128. The processor 124 and/or transmitter 126 illustratively include internal memory storage, for example, for storing instructions for execution and/or data for retrieval, although in some embodiments, distinct memory storage may be provided. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others.

Figure 7:
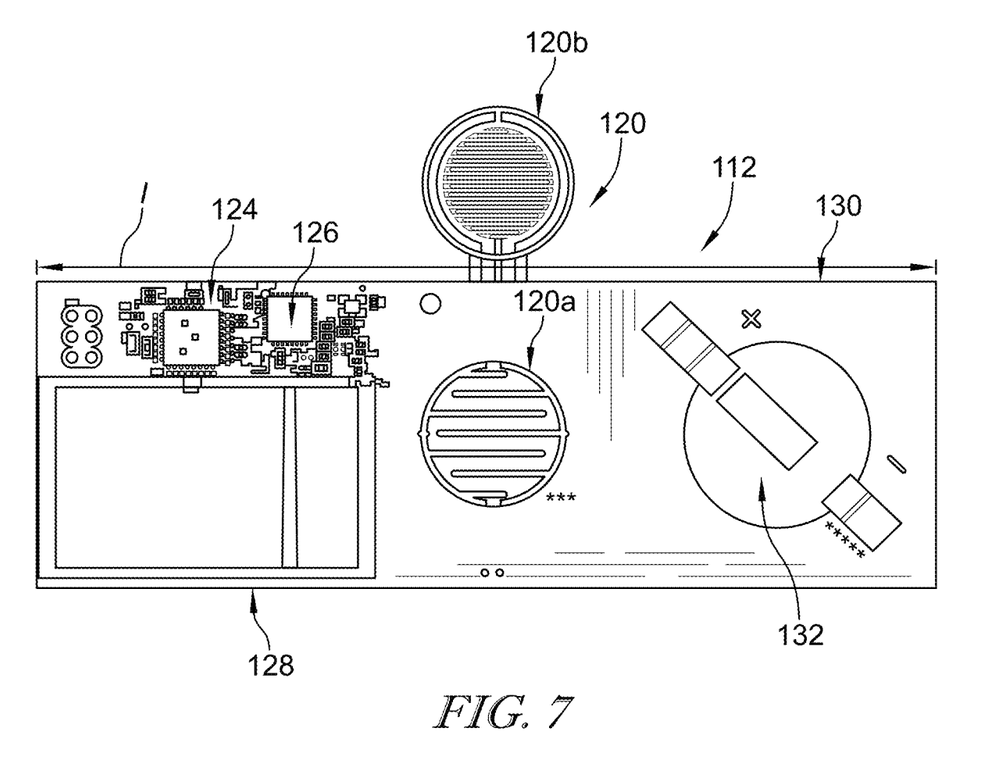
FIG. 7 is a top plan view of the tail patch of FIGS. 5 and 6 with an outer covering removed for descriptive ease.

Referring now to FIG. 7, the tail patch 112 is a shown with an outer covering removed for descriptive ease. The tail patch 112 includes a circuit board 130, formed as a flexible circuit board to allow conforming fit to the animal asset as discussed in additional detail below. The circuit board 130 includes the mount detector 120, processor 124, and transmitter 126 mounted thereon.

In the illustrative embodiment, the mount detector 120 is shown embodied as a mechanical contact switch formed having a portion 120a formed integral with the circuit board 130 having another portion 120b (shown extending upwards for folding over the circuit board portion) configured to overlap the portion integral with circuit board to receive contact for engagement to close the switch, although in some embodiments, the mount detector 120 may include any suitable manner of detection of asset mounting, including but not limited to mechanical switch distinct from the circuit board 130, accelerometers, vibration detectors, estrus detectors, and/or combinations thereof. The mount detector 120 is illustratively positioned centrally along the lateral extent e of the circuit board 130.

The antenna 128 is illustratively embedded within a portion (left) of the circuit board 130. The processor 124 and transmitter 126 are each illustratively mounted on one side (left) of the circuit board 130, although in some embodiments, one or both of the processor 124 and transmitter 126 may be mounted on the other side (right) of the circuit board 130 relative to center. A battery mount 132 for receiving connection of a local power source, such as a battery 150, is illustratively arranged on a side (right) portion of the circuit board 130.

Figure 8A:
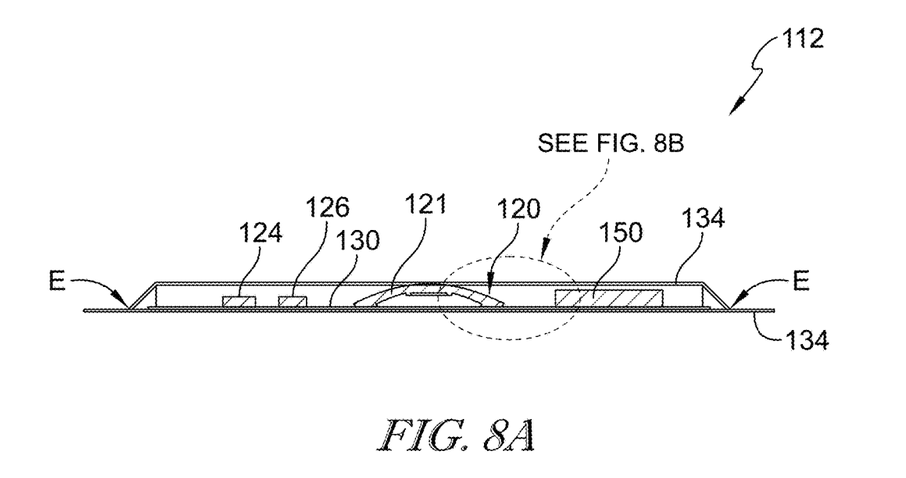
FIG. 8A is a side elevation view of the tail patch of FIGS. 5-7 having a portion of the outer covering removed for descriptive ease.

Referring to FIG. 8A, the elevation (side) view of the tail patch 112 is shown including an outer covering 134 partially removed for descriptive ease. The outer covering 134 is illustratively embodied as two sheets of plastic, e.g., polypropylene material, arranged on opposite sides of the circuit board 130. The sheets of the outer covering 134 are illustratively sealed to each other E around the periphery of the circuit board 130 to enclose the circuit board 130 and its mounted components within the outer covering 134. The outer covering 134 is flexible to allow conforming shape of the tail patch 112 with the animal asset.

In the illustrative embodiment of FIG. 8A, the mount detector 120 includes a flexible activation member 121 for receiving pressure under asset mounting. The activation member 121 is illustratively embodied as a rubber dome having electrical connection (e.g., portion 120b) on its interior such that under downward pressure of asset mounting, the rubber dome collapses inward to engage the electrical connections (e.g., 120b) with the other electrical connections (e.g., 120a) of the mount detector 120 which are on the circuit board 130 to close the switch to indicate mounting is occurring. The pressure onto the activation member 121 is provided through the top outer covering 134.

The tail patch 112 is illustratively formed with low (thin) profile. The low profile configuration of the tail patch 112 can decrease the potential for interference of the tail patch 112 in normal use. The low profile configuration of the tail patch 112 can assist in flexible conformance to the animal asset, enhancing ease of attachment to the asset and reducing inadvertent decoupling of the tail patch 112 from the asset.

Figure 8B:
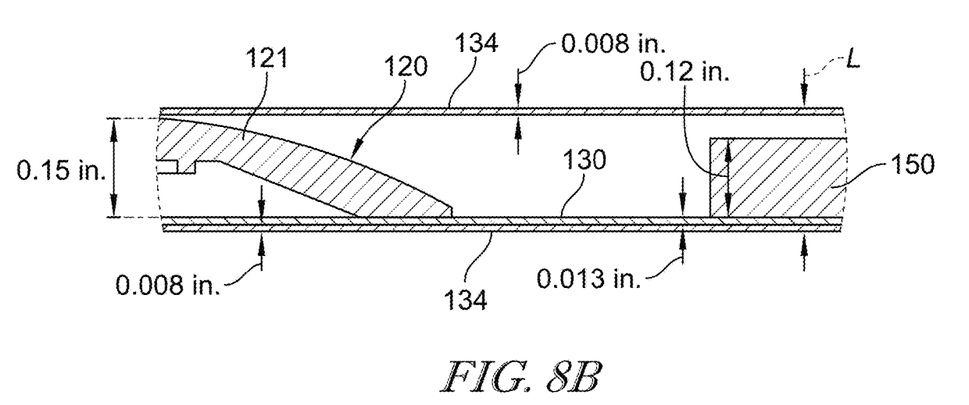
FIG. 8B is a side elevation view of a portion of the tail patch of FIG. 8A with closer zoom.

Referring to FIG. 8B, the circuit board 130 is illustratively embodied to have thickness of t about 0.013 inches, although in some embodiments may have any suitable thickness, for example, thickness within the range of about 0.003 inches to about 0.2 inches. Each sheet of the outer covering 134 is embodied to have thickness of about 0.008 inches, although in some embodiments may have any suitable thickness, for example, thickness within the range of about 0.001 inches to about 0.2 inches. In the illustrative embodiment, the power source 150 is illustratively embodied as a coin battery having a thickness of about 0.12 inches, although in some embodiments may have any suitable thickness, for example, thickness within a range of about 0.01 to about 0.3 inches. In the illustrative embodiment, the rubber dome of the activation member 121 is embodied to have an uncompressed thickness of about 0.15 inches, although in some embodiments may have any suitable thickness, for example, thickness within the range of about 0.05 to about 0.5 inches.

The entire tail patch 112 illustratively includes a maximum thickness about 0.2 inches, but in some embodiments, the total thickness of the tail patch 112 may include any suitable thickness, for example, thickness within the range of about 0.1 to about 0.6 inches. The tail patch 112 is illustratively embodied to have length of 5.5 inches and width of 2.5 inches, but in some embodiments, may have any suitable length and width, for example, within the range of about 3 to about 10 inches length and about 1 to about 5 inches width.

The circuit board 130 is illustratively formed of flexible polyimide substrate and appropriate conductors which may include copper or other suitable conducting material. The circuit board 130 is illustratively formed of two layers of flexboard material having conductors and the antenna 128 arranged therebetween. The circuit board 130 may include one or more stiffeners coupled to the exterior of the flexboard 130 or, alternatively, embedded between the layers of flexboard material to provide strength. Suitable stiffeners may include FR-4 glass reinforced epoxy laminate or equivalent.

Figure 9:
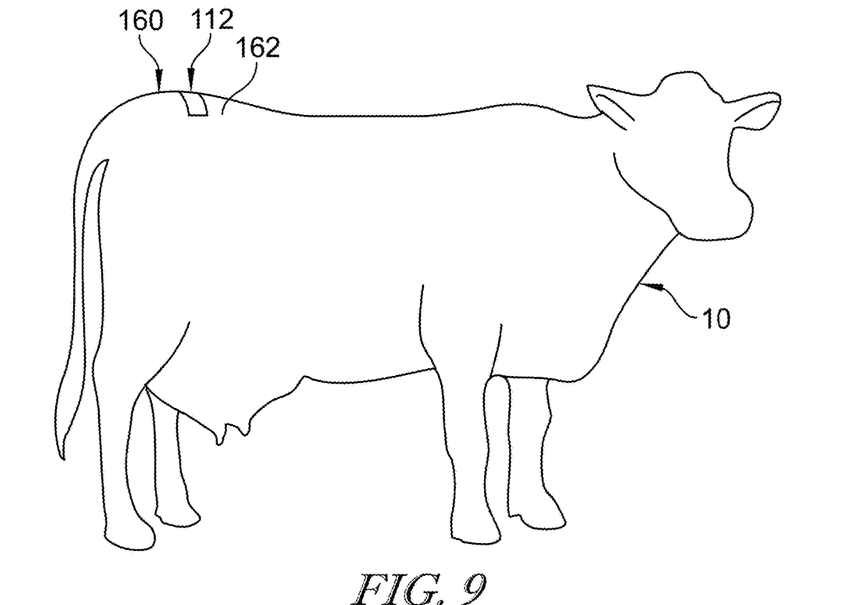
FIG. 9 is a perspective view of an animal assets having the tail patch of FIGS. 5-8B secured thereto across the animal's tail head.

Referring now to FIG. 9, the tail patch 112 is shown attached to the animal asset. The tail patch 112 is illustratively secured to the animal assert near the animal's hind quarters, and more specifically about the asset's tail head 160 as discussed in additional detail relative to FIGS. 10A & 10B.

Figure 10A:
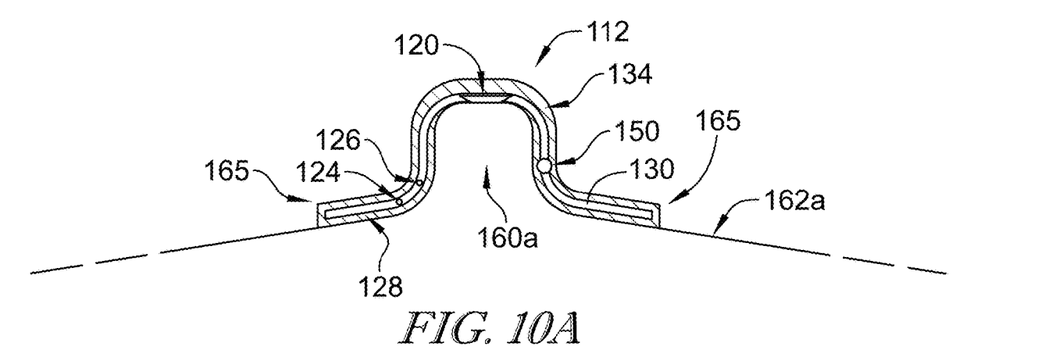
FIG. 10A is a longitudinal view along the animal's spine of FIG. 9 showing that the tail patch is secured to the animal with conforming engagement with the tail head.

Referring now to FIG. 10A, the animal asset's tail head 160a is shown viewed longitudinally along the asset's spine, and can be observed to extend above the surface of the animal's body 162, imposing a mound shape on which the tail patch 112 is mounted. For purpose of comparative demonstration, referring briefly to FIG. 10B, it can be observed that another animal may have a differently shaped tail head 160b, in this instance being wider and shallower than 160a, although any variety of tail head shape can be observed. With this understanding of the diversity of the shape that tail head 160 can have, the benefits of flexibility of the tail patch 112 can be appreciated.

As shown in FIG. 10A, the tail patch 112 is coupled with the asset with conforming curvature about the tail head 160. More specifically, the tail patch 112 is curved to conform with the shape of the tail head 160a and coupled to the asset by adhesive. Referring again to FIG. 10B, the tail patch 112 is coupled with another asset having tail head 160b with different shape than tail head 160a. Flexibility of the tail patch 112, including the flexible circuit board 130, allows conforming of the tail patch 112 to the shape of the tail head 160b. More specifically, in each of FIGS. 10A and 10B, the tail patch 112 is secured to extend across the tail head 160a,b with curvature conforming with the particular tail head 160a,b. In the illustrative embodiment, the tail patch 112 is secured to extend across the tail head 160a,b to have an arched curve along its center portion between lateral ends 165. As the circuit board 130 extends between the lateral ends 165 of the tail patch 112, the circuit board 130 being flexible allows conforming curvature thereof to allow improved contact with the animal asset's unique tail head 160 shape.

The flexibility of the tail patch 112 can ensure better contact of the tail patch 112 with the asset, providing ease of attachment, and/or lowering the risk of inadvertent decoupling of the tail patch 112. Together with the low profile aspects of the tail patch 112 as discussed above, reliability and/or ease of attachment of the tail patch 112 with the asset is improved. Although the tail patch 112 is illustratively shown in FIGS. 10A & 10B to have substantially complete contact with the animal asset about the tail head 160a,b, in some embodiments, the tail patch 112 may be suitably secured about the tail head 160a,b, with substantial conformance to the curvature of the tail head 160 but with less than perfect contact between lateral ends 165.

Figure 10B:
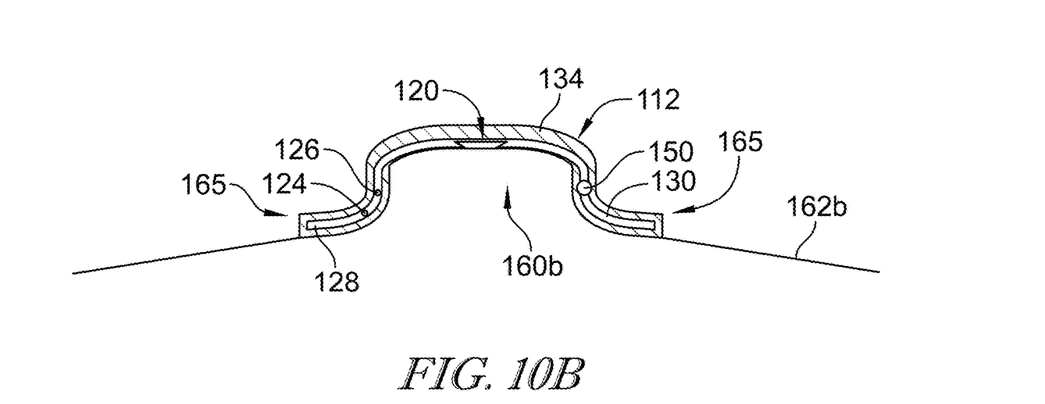
FIG. 10B is a longitudinal view along the animal's spine of FIG. 9 showing that the tail patch is secured to the animal with conforming engagement with a differently shaped tail head from that of FIG. 10A.

Still referring to FIGS. 10A & 10B, the tail patch 112 is coupled to the animal asset by arranging the mount detector 120 to be on top of the tail head 160. The right and left portions of the flexible circuit board 130 (in the orientation of FIGS. 10A & 10B) are arranged on opposite sides of the tail head 160. Notably, the components secured with the right and left portions of the circuit board 130 are thus arranged on the side of the tail head 160. For example, the processor 124, transmitter 126, and antenna 128 are arranged on the left side of the tail head 160, and the power source 150 is arranged on the right side of the tail head 160 (in the orientation of FIGS. 10A & 10B). Arrangement of components on the flexible circuit board on either side of the tail head 160 can allow the mount detector 120 to be alone located on top of the tail head 160 for preferred placement and/or unobstructed activation under asset mounting.

Within the present disclosure, the tail patch 112, the gateway 114, and/or the remote server 116 may be arranged for configurable setting of threshold mount activity to indicate breeding. For example, a single mount indicator signal may be set as the default threshold for transmission of any one or more of the breeding signal and/or the indication of the breeding signal. Yet, one or more of the tail patch 112, the gateway 114, and/or the remote server 116 may be configured to a higher threshold of mount indication, for example, 3 or more mount activation and/or breeding signals within 10 seconds.

Within the present disclosure, a method of using a monitoring device may include fitting a tail patch to a tail head of an animal asset, and receiving communication indicating mounting of the animal asset from the tail patch. The receiving may include receiving a notification on a personal mobile device.

In some embodiments, the fitting may include flexing the tail patch to conform with the tail head of the animal asset. The fitting may include arranging a mount detector on top of the tail head of the animal asset. The fitting may include applying an adhesive to at least one of the tail patch and the animal asset.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A long range livestock monitor for communicating breeding periods of an animal asset, the monitor comprising:
   a flexible tail mount housing for securing about the animal asset's tail head near the asset's hindquarters,
   a mount detector arranged within the tail mount housing, the mount detector configured to sense physical effect of asset mounting and to responsively generate a mount indicator signal, and
   a communications control system in communication with the mount detector, the communications control system including a processor for receiving the mount indicator signal from the mount detector and determining mounting activity based on the mount indicator signal, and a transmitter for communicating a mounting signal indicating mounting responsive to determination of mounting activity, the communications control system comprising a flexible control board within the flexible tail mount housing and arranged to extend by flexing across the tail head of the asset with conforming curvature.

2. The long range livestock monitoring system of claim 1, wherein the tail mounting housing is coupled to the asset by conforming engagement with a tail head of the asset.

3. The long range livestock monitoring system of claim 1, wherein the mount detector is coupled with the flexible control board.

4. The long range livestock monitoring system of claim 3, wherein the mount detector is formed at least partly integral with the flexible control board.

5. The long range livestock monitoring system of claim 3, wherein the transmitter is coupled with the flexible control board.

6. The long range livestock monitoring system of claim 3, wherein the processor is coupled with the flexible control board.

7. The long range livestock monitoring system of claim 1, wherein at least one the transmitter and the processor is arranged on one lateral side of the tail head of the asset.

8. The long range livestock monitoring system of claim 7, wherein each of transmitter and the processor is arranged on one lateral side of the tail head of the asset.

9. The long range livestock monitoring system of claim 7, wherein the tail mount housing is mounted to the asset by conforming engagement with the tail head of the asset.

10. The long range livestock monitoring system of claim 1, wherein the mount detector is arranged on top of the tail head of the asset.

11. The long range livestock monitoring system of claim 1, further comprising a flexible control board having thickness less than 0.02 inches.

12. The long range livestock monitoring system of claim 1, wherein the tail mount housing defines a maximum thickness of less than 0.25 inches.

13. The long range livestock monitoring system of claim 1, wherein the transmitter is a LoRa transmitter.

14. A long range livestock monitoring system for communicating breeding periods of an animal asset, the system comprising:
   a flexible tail mount housing for securing to the animal asset's tail head near the asset's hindquarters,
   a mount detector configured to sense physical effect of asset mounting and to responsively generate a mount indicator signal, the mount detector arranged within the flexible tail mount housing to receive impact upon asset mounting, and
   a communications control system in communication with the mount detector, the communications control system including a processor for receiving the mount indicator signal from the mount detector and determining mounting activity based on the mount indicator signal, and a transmitter for communicating a mounting signal indicating mounting responsive to determination of mounting activity, the communications control system comprising a flexible control board within the flexible tail mount housing and arranged to extend by flexing across the tail head of the asset with conforming curvature.

15. The long range livestock monitoring system of claim 14, further comprising a LoRa gateway configured to receive the breeding signal from the communications control system, wherein the LoRa gateway is arranged more than 1 mile from the asset having no intermediary communication device between the flexible tail mount housing and the LoRa gateway.

16. The long range livestock monitoring system of claim 15, wherein the LoRa gateway is configured to communicate an indication of the mounting signal with a remote server responsive to receiving the mounting signal.

17. The long range livestock monitoring system of claim 14, wherein the transmitter is a LoRa transmitter configured to communicate the mounting signal with a frequency within the range of 902.3 to 914.9 MHz.

18. A long range livestock monitoring system for communicating breeding periods of an animal asset, the system comprising:
a flexible tail mount housing for securing to the animal asset's tail head near the asset's hindquarters,
a mount detector arranged with the tail mount housing, the mount detector configured to sense physical effect of asset mounting and to responsively generate a mount indicator signal, and
a communications control system in communication with the mount detector, the communications control system including a processor for receiving the mount indicator signal from the mount detector and determining mounting activity based on the mount indicator signal, and a LoRa transmitter for communicating a mounting signal indicating mounting responsive to determination of mounting activity, the communications control system comprising a flexible control board within the flexible tail mount housing and arranged to extend by flexing across the tail head of the asset with conforming curvature.

19. The long range livestock monitoring system of claim 18, wherein the mount detector is formed at least partly integral with the flexible control board.

20. The long range livestock monitoring system of claim 18, further comprising a flexible control board having thickness less than 0.02 inches.

21. The long range livestock monitoring system of claim 18, wherein the tail mount housing defines a maximum thickness of less than 0.25 inches.

\* \* \* \* \*